March 1, 1955  A. O. PITNER  2,703,264
PISTON ENGINE
Filed May 28, 1951  6 Sheets-Sheet 1

Inventor
ALFRED OTTO PITNER
By Linton and Linton Attorneys

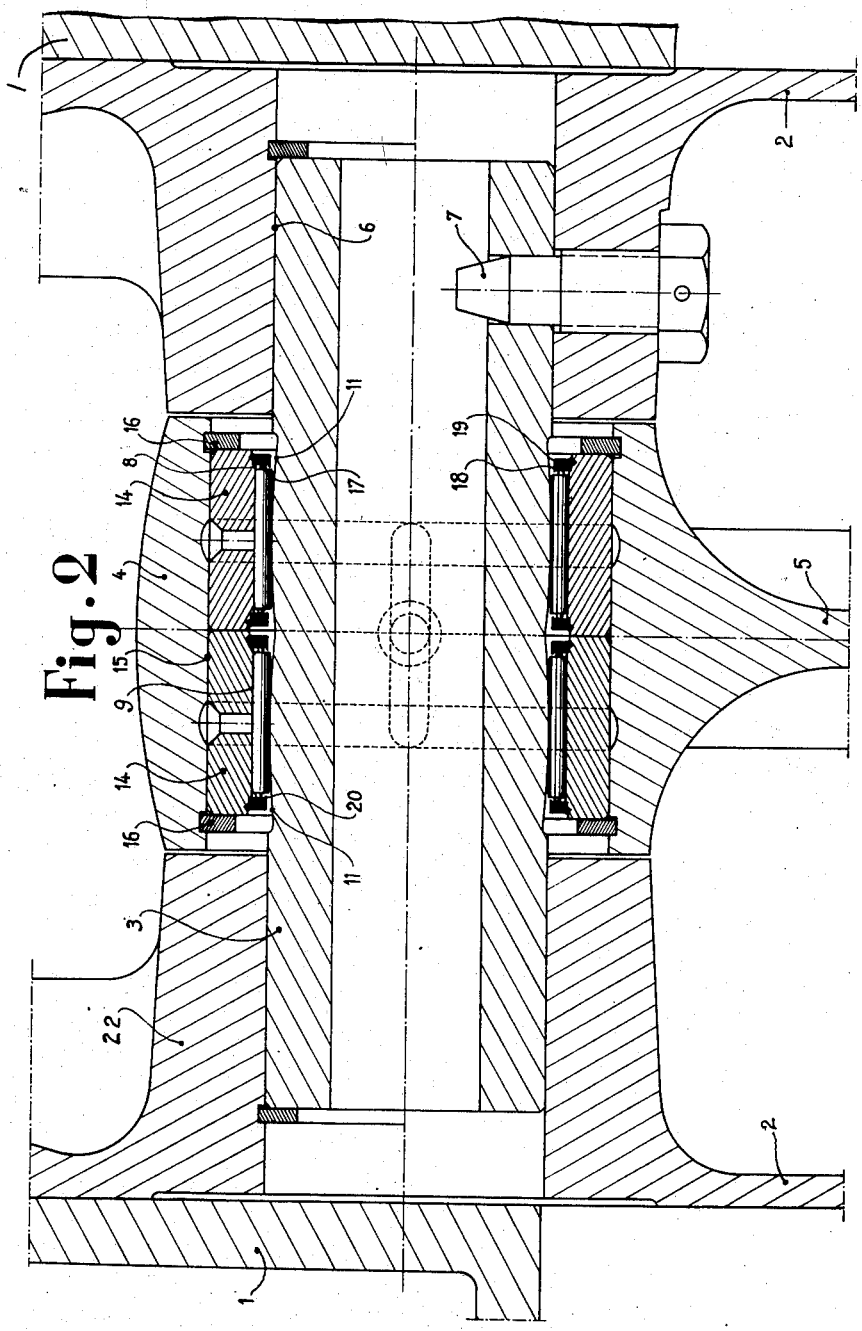

March 1, 1955
A. O. PITNER
2,703,264
PISTON ENGINE
Filed May 28, 1951
6 Sheets-Sheet 3
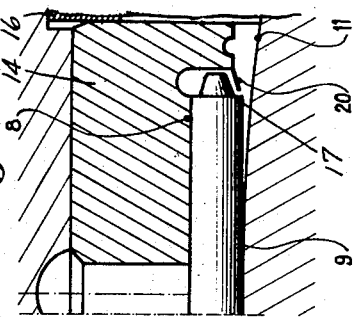
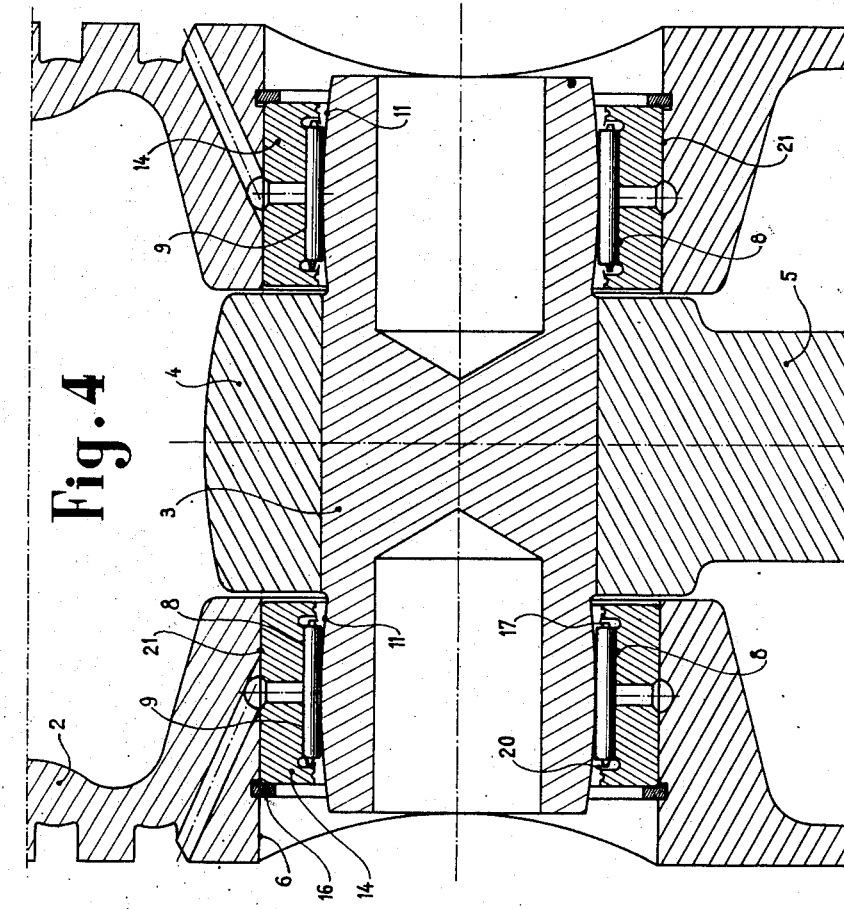
Inventor
ALFRED OTTO PITNER March 1, 1955

A. O. PITNER 2,703,264

PISTON ENGINE

Filed May 28, 1951

Inventor
ALFRED OTTO PITNER

March 1, 1955 — A. O. PITNER — 2,703,264
PISTON ENGINE
Filed May 28, 1951 — 6 Sheets-Sheet 5
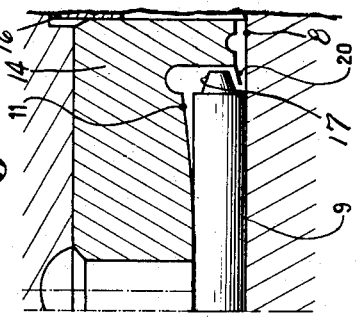
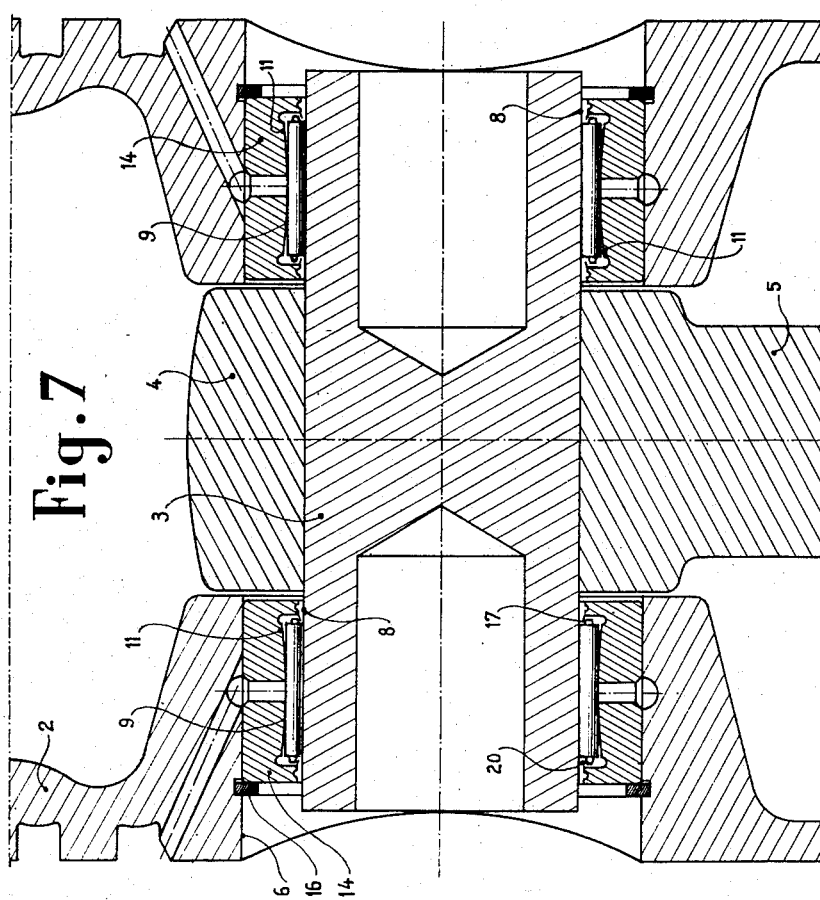
Inventor
ALFRED OTTO PITNER March 1, 1955  A. O. PITNER  2,703,264
PISTON ENGINE
Filed May 28, 1951  6 Sheets-Sheet 6
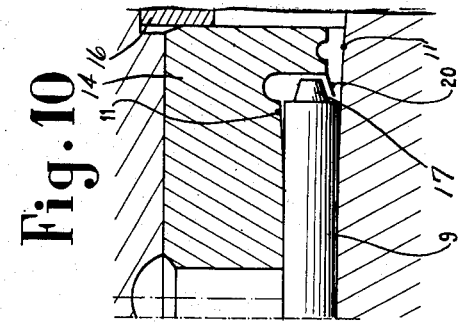
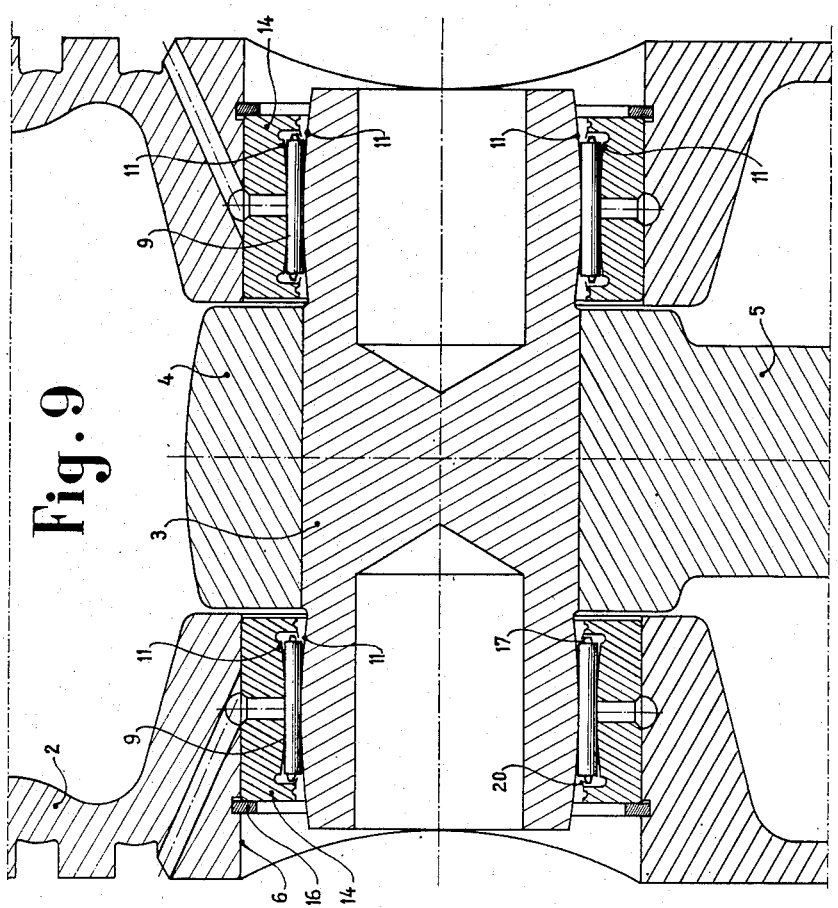
Inventor
ALFRED OTTO PITNER

United States Patent Office 2,703,264
Patented Mar. 1, 1955

2,703,264
PISTON ENGINE

Alfred Otto Pitner, Paris, France, assignor to Societe dite: Societe Anonyme des Roulements a Aiguilles, Rueil-Malmaison, Oise, France, a French company Application May 28, 1951, Serial No. 228,557

Claims priority, application France May 31, 1950

14 Claims. (Cl. 309—19)

This invention relates to prime movers, pumps, internal combustion and other engines having pistons reciprocating in cylinders.

In engines having cylinders provided with pistons, that is to say engines such as internal combustion engines, compressors and the like, in order to reduce the friction and wear, to ensure a better permanence of efficiency, to facilitate lubrication and to increase output, the pivoted axes of the pistons at the ends of the connecting rods have already been provided with roller bearings in which the diameter of the rollers is relatively small as compared with their lengths. These roller bearings are preferably in the form of needle bearings.

Up to the present time, these bearings have been arranged with an exterior cylindrical race, with movable elements for each bearing, and further, with an interior cylindrical race for the same elements. By reason of angular deviations which may arise during the operation of the piston, and which are due particularly to elastic deformation of the assembled parts, the capacity for loading of the bearings thus formed is considerably reduced and the life of operation of these bearings is equally reduced, so that these elements have to be frequently renewed.

The present invention has for its object the arrangement of engines of this type in which the bearings maintain in practice their full loading capacity, even in the case in which, where, for example, distortion occurs in elements under load, the alignment is no longer accurate and results in overloads of the ends of the mobile elements of the bearings of these axes.

In machines in general use, when loading passes from the ends of the connecting rods to the axes of the pistons, this loading determines the bending of these axes so that they are no longer parallel to the cylindrical elements of the bearings. Further, under this loading, the gudgeon bosses of the pistons become distorted, and, further, the assembly of parts is no longer operating under the good conditions necessary for a bearing having cylindrical rollers and cylindrical races.

The same applies to piston engines in which the axes of the pistons are mounted directly in the gudgeon bosses of these pistons and are fixed therein, and where the rollers are disposed in the ends of the connecting rods themselves, oscillation then taking place between the ends of the connecting rods and the axes of the pistons mounted rigidly in these pistons.

According to the present invention in engines having at least one piston which has a cylindrical roller bearing interposed between the piston and the connecting rod, at least, one of the two races of the roller bearing is no longer cylindrical but has a convexity towards the movable cylindrical elements in such a manner as to avoid any overload on the ends of these movable elements.

Following this principle, according to the present invention, the curved generating-lines for the race are preferably generating-lines of constant radius of curvature from one end to the other, but, without departing from the limits of the present invention, this radius of curvature may have differing values for differing points along these generating-lines. When this radius of curvature is constant, or when it has various values, its size will always be chosen such that regard is taken to the loading to which the axis of the piston is subjected.

However, in numerous cases the value for each radius of curvature is equal at least to eighty times the total length of the movable elements.

When the convex race is disposed as the outer race of the bearing, its smallest diameter is adjacent to the middle of the length of each mobile element of the bearing, and the diameter of this race increases progressively towards the ends of these elements.

It is obvious, and similarly to what has been said above, the two races of the same assembly of cylindrical rolling elements may be convex relatively to the mobile elements, in which case the respective values of the radius of curvature of the two races will preferably be such as to ensure an operation for the elements of the bearing equal to those obtained with a single convex race.

Always within the scope of the invention:

a. The axis of the piston can be fixed to the piston itself, in which case the end of the connecting rod is loose on this axis and the cylindrical roller elements are disposed between this axis and the end of the connecting rod, and the arrangement can then consist either of a single bearing or of two bearings, or alternatively, b. The axis of the piston is fixed to the end of the connecting rod and is loose in the gudgeon bosses of the piston, the arrangement then consisting of two bearings, each of these bearings being mounted in one of the gudgeon bosses of the piston.

In each of the cases mentioned above, each race may be mounted:

a. Directly on the axis of the piston,
b. On a hoop carried on this axis.

The invention can be carried out in many different ways.

The diagrammatic drawings annexed, given by way of example and which do not in any way limit the extent of the present invention, refers to a four cylinder engine disposed according to the principles above indicated, one of the pistons of this engine being provided with a single bearing having cylindrical elements whilst the other three pistons show two bearings of this type and one of the figures shows an engine provided with pistons of one of these types.

In the drawings:

Fig. 2 is a sectional elevation through another cylinder provided with a piston having two bearings on its axis, these bearings being the same type as Fig. 1.

Fig. 4 shows, in sectional elevation, a piston in which the axis is fixed in the end of the connecting rod and in which the bearings are mounted on the gudgeon bosses of the piston.

Fig. 5 shows, on a larger scale, a part of a bearing of the type as Fig. 4.

Figs. 7 and 8 are similar to Figs. 4 and 5, showing a piston having two bearings with convex outer races.

Figs. 9 and 10, similarly to Figs. 4 and 5, show a piston having two bearings in which each has two convex races.

In the various figures, the same reference letters indicate the same elements.

Figure 1:
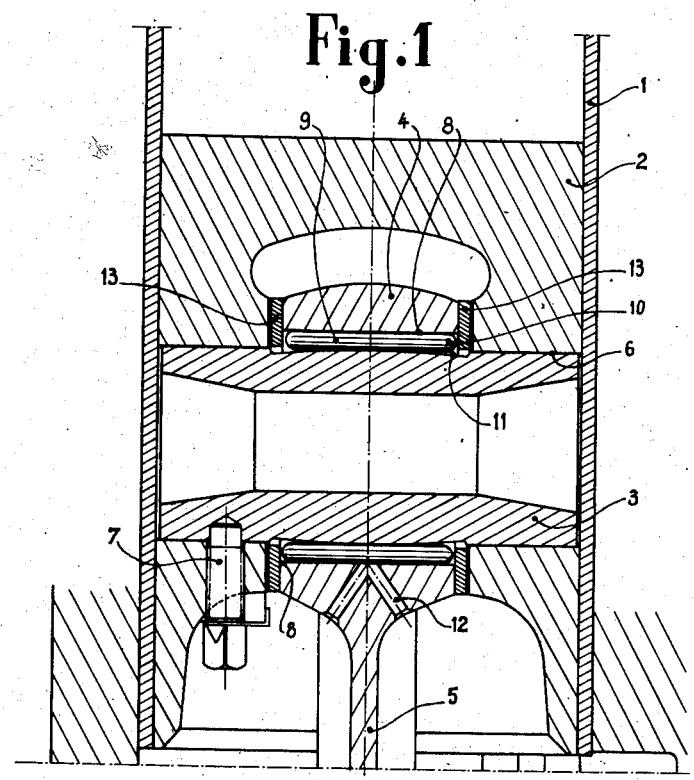
Fig. 1 is a sectional elevation through a cylinder provided with a piston having a single bearing on its axis and having an interior race which is convex towards the cylindrical elements.

In Fig. 1, 1 is the cylinder of a piston engine of any known type; 2 is the piston movable in this cylinder; 3 is the pivotal axis of the end 4 of the connecting rod 5 on this piston, which axis is carried by the piston itself. This axis is disposed within a hole 6 in the piston and is secured therein by any desired means, such as, for instance, a screw 7.

In this figure, the end of the connecting rod has a cylindrical bearing disposed in it.

In this case, the cylindrical race 8 of the bearing is the outer race and is formed by a bore formed in the end of the connecting rod itself. The cylindrical elements of the bearing are the needles 9 having rounded ends 10. The convex race 11 of the bearing is formed, according to this invention, by a convex part provided on the axis 3 and in which the convexity is turned towards the needles.

The radius of curvature of this part is constant from one end to the other, and its value is equal at least to eighty times the length of the needles 9.

The lubrication of this race is assured by means of passages 12. The rings 13 serve as axial abutments for the needles.

In a cylinder of the above-mentioned type, when the engine is running, at each distortion of the axis of the piston, the needles are displaced relatively to the convex part and maintain the full capacity of loading for the bearing.

In Fig. 2, the cylinder shown differs from that above by the substitution around the axis 3 of the piston 2 of two needle bearings similar to the bearing mentioned above.

Figure 3:
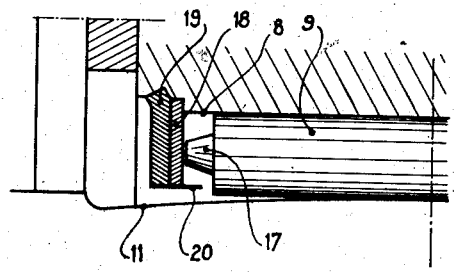
Fig. 3 shows, on a larger scale, a part of the bearing, this part of bearing being the same type as Fig. 2.

Each of these bearings consists of an exterior race ring 14 disposed within a bore 15 in the end 4 of a connecting rod 5, and the whole of rings 14 of the two bearings is maintained in this bore 15 by the flanges 16. The ends 17 of the needles 9 of each bearing are here of reduced diameter. They are in front of axial abutments 18 (Fig. 3) maintained in axial direction by the flanges 19. The rings 20 overhang the ends of the needles and prevent these falling out, such arrangement of needles being indeed known per se.

In Figs. 4 and 5, the piston shown is similar to that of Fig. 2, provided with two needle bearings, but, in this case the axis 3 is fixed in the end of the connecting rod 4, so that the needles 9 and their mounting rings 14 are disposed in the bores 21 of the gudgeon bosses 22 of the piston 2, the remainder of the arrangement being similar to that of Fig. 2, and the axis 3 being provided with two convex races 11 formed as above stated.

Figure 6:
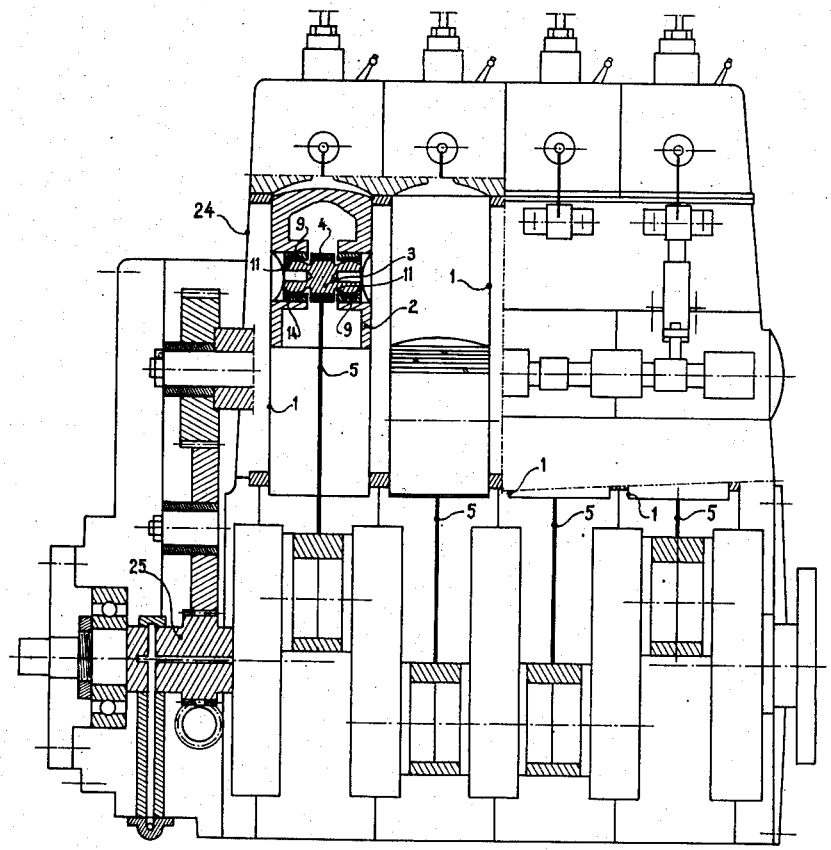
Fig. 6 is a sectional elevation of an engine having four cylinders arranged in accordance with Figs. 4 and 5.

In Fig. 6, the engine shown in sectional elevation has four cylinders. The piston of each of these cylinders is provided, as is that of Fig. 4, with two needle bearings 9 mounted on interior convex races 11 carried by the axis 3. In this figure, 24 is the crank case of this motor 25, its driving shaft being driven by the connecting rods 5—5—5—5 of each of the pistons disposed in the cylinders 1—1—1—1.

In Figs. 7 and 8, the piston shown is the same as that of Figs. 4 and 5, and it only differs from this latter by the fact that the races 11, convex towards the needles are, in this case, the exterior races, and the cylindrical races 8 are the interior races.

Figs. 9 and 10 only differ from Figs. 7 and 8 by the fact that the two races of each bearing are the two races 11 in which each is convex towards the needles. As has already been indicated, in this arrangement the respective value of the radius of curvature of the two races is preferably such that they allow the elements of the bearing to operate in a manner similar to that which would occur with a single convex race.

What I claim is:

1. In an engine, at least one cylinder provided with a piston reciprocating therein, an axis for the said piston, a connecting rod arranged on the said axis and a bearing for the said piston, the said bearing including movable cylindrical elements arranged around the axis of the piston and, at least, an inner race provided on the said axis with a convexity towards the said movable cylindrical elements, the radius of curvature of the curved generating lines of this race having a variable value from one end to the other of the said lines.

2. In an engine, at least one cylinder provided with a piston reciprocating therein, an axis for the said piston, a connecting rod arranged on the said axis and a bearing for the said piston, the said bearing including movable cylindrical elements arranged around the axis of the piston and, at least, an outer race provided on the said axis with a convexity towards the said movable cylindrical elements, the smallest diameter of the convex race being adjacent to the middle of the length of each movable element and the diameter of this race increasing progressively towards the ends of these elements.

3. In an engine, at least one cylinder provided with a piston reciprocating therein, an axis for the said piston, a connecting rod arranged on the said axis and a bearing for the said piston, the said bearing including movable cylindrical elements arranged around the axis of the piston, the inner race and the outer race of this bearing being arranged with a convexity towards the said movable cylindrical elements, and the greatest diameter of the inner race and the smallest diameter of the outer race being adjacent to the middle of the length of each movable element of the bearing and the diameter of each race varying progressively towards the ends of these races.

4. In an engine, at least one cylinder provided with a piston reciprocating therein, an axis for the said piston, a connecting rod arranged on the said axis, and a bearing for the said piston, the said bearing including movable cylindrical elements arranged around the axis of the piston, the inner race and the outer race of this bearing having a convexity towards the said movable cylindrical elements, the respective values of the radius of curvature of these two races being such to ensure that the operation of the elements of the bearing is equivalent to that obtained with a single convex race.

5. In an engine, at least one cylinder provided with a piston reciprocating therein, an axis for the said piston, a connecting rod fixed on the said axis with the said axis loose relatively to the gudgeon bosses of the piston, two bearings arranged in these gudgeon bosses, each of these bearings being disposed in one of the said gudgeon bosses, and one, at least, of these bearings including movable cylindrical elements arranged around the axis of the piston and, at least, an inner race provided on the axis of the piston with a convexity towards the said movable cylindrical elements.

6. In an engine, at least one cylinder provided with a piston reciprocating therein, an axis for the said piston, a connecting rod fixed on said axis, and, at least, a bearing for the said piston, the said bearing including movable cylindrical elements arranged around the axis of the piston and, at least, an inner race provided on the said axis with a convexity towards the said movable cylindrical elements, the said inner race being disposed on a hoop mounted on the axis of the piston.

7. An improvement in roller bearings for piston axis comprising a piston axis pin providing an inner race of the roller bearings, cylindrical elements movably arranged around said piston pin inner race, means for retaining said elements around said piston pin and providing an outer race for said elements, and at least one of said races being formed convex towards said cylindrical elements.

8. An improvement in roller bearings for piston axis comprising a piston axis pin, cylindrical elements movably arranged around said piston pin, means for retaining said elements around said piston pin, and at least one inner race provided on the periphery of said piston pin for said elements and being formed convex towards said cylindrical elements.

9. An improvement in roller bearings for piston axis comprising a piston axis pin, needles movably arranged around said piston pin, means for retaining said needles around said piston pin, and at least one inner race provided on the periphery of said piston pin for said needles and being formed convex towards said needles.

10. An improvement in roller bearings for piston axis comprising a piston axis pin, cylindrical elements movably arranged around said piston pin, means for retaining said elements around said piston pin, and at least one inner race provided on the periphery of said piston pin for said elements and being formed convex towards said cylindrical elements and said inner race having the radius of curvature of its convex formation generating lines equal to at least eighty times the total length of one of said cylindrical elements.

11. An improvement in roller bearings for piston axis comprising a piston axis pin providing an inner race of the roller bearings, cylindrical elements movably arranged around said piston axis inner race, an outer race for retaining said elements around said axis pin inner race and said outer race having a convex surface extending towards said elements with the smallest diameter of said convex surface being adjacent to the middle of the length of each of said elements and the diameter of the convex surface progressively increasing towards the ends of said elements.

12. A roller bearing for piston axis comprising a piston axis pin providing an inner race for said bearing, cylindrical elements movably arranged around said piston pin race, means for retaining said elements around said piston pin and providing an outer race for said elements and both of said races having convex surfaces extending towards said cylindrical elements.

13. A roller bearing for piston axis comprising a piston, a gudgeon pin of said piston being fixedly connected thereto and providing an inner race of said bearing, a connecting rod having an end portion thereof surrounding said pin and providing an outer race of said bearing, a plurality of cylindrical elements positioned between said pin inner race and the outer race of said rod and at least, one of said races being formed convex and extending towards said cylindrical elements.

14. A roller bearing for piston axis comprising a piston, a connecting rod, a piston axis pin providing an inner race for said bearing, cylindrical elements positioned around said pin inner race, means for retaining said elements around said inner race and providing an outer race therefor, at least one of said races being formed convex towards said cylindrical elements and said piston axis pin being fixedly mounted in an end of said connecting rod and loosely positioned in the piston axis bosses of said piston.

References Cited in the file of this patent

UNITED STATES PATENTS

| | | |
|---|---|---|
| 2,043,014 | Shoemaker | June 2, 1936 |

FOREIGN PATENTS

| | | |
|---|---|---|
| 117,835 | Switzerland | Dec. 1, 1926 |
| 79,836 | Sweden | Mar. 13, 1934 |
| 501,427 | Great Britain | May 19, 1937 |
| 608,380 | Great Britain | Sept. 14, 1948 |